(12) United States Patent
Clark

(10) Patent No.: US 10,878,427 B2
(45) Date of Patent: Dec. 29, 2020

(54) SYSTEM AND METHOD TO ENSURE COMPLIANCE WITH STANDARDS

(71) Applicant: ISMS Solutions, LLC, Linthicum, MD (US)

(72) Inventor: Jason Clark, Linthicum, MD (US)

(73) Assignee: ISMS SOLUTIONS, LLC, Linthicum, MD (US)

(*) Notice: Subject to any disclaimer, the term of this patent is extended or adjusted under 35 U.S.C. 154(b) by 166 days.

(21) Appl. No.: 15/497,972

(22) Filed: Apr. 26, 2017

(65) Prior Publication Data

US 2017/0308907 A1 Oct. 26, 2017

Related U.S. Application Data

(60) Provisional application No. 62/327,892, filed on Apr. 26, 2016.

(51) Int. Cl.
| | |
|---|---|
| *G06Q 10/10* | (2012.01) |
| *G06Q 30/02* | (2012.01) |
| *G06Q 30/06* | (2012.01) |
| *G06Q 10/04* | (2012.01) |
| *G06Q 10/06* | (2012.01) |
| *G06Q 30/00* | (2012.01) |
| *G06Q 50/18* | (2012.01) |

(52) U.S. Cl.
CPC ............ *G06Q 30/018* (2013.01); *G06Q 10/10* (2013.01); *G06Q 50/18* (2013.01)

(58) Field of Classification Search
CPC ....... G06Q 10/10; G06Q 30/018; G06Q 50/18
USPC .......................................... 705/1.1–912, 317
See application file for complete search history.

(56) References Cited

U.S. PATENT DOCUMENTS

| | | | | |
|---|---|---|---|---|
| 10,482,396 B2* | 11/2019 | Dick | ...................... | G06Q 10/00 |
| 2005/0071185 A1* | 3/2005 | Thompson | ............. | G06Q 10/10 |
| | | | | 705/317 |
| 2005/0091067 A1* | 4/2005 | Johnson | ............. | G06Q 10/0639 |
| | | | | 705/7.38 |
| 2008/0082354 A1* | 4/2008 | Hurry | ................... | G06Q 30/00 |
| | | | | 705/317 |
| 2008/0091676 A1* | 4/2008 | Zwilling | ................ | G06Q 10/06 |
| 2010/0125528 A1* | 5/2010 | Reddy | .................... | G06Q 10/10 |
| | | | | 705/317 |
| 2010/0179843 A1* | 7/2010 | Johnson | ................. | G06Q 10/00 |
| | | | | 705/7.11 |
| 2010/0324952 A1* | 12/2010 | Bastos | ................... | G06Q 10/00 |
| | | | | 705/7.28 |
| 2012/0216243 A1* | 8/2012 | Gill | ......................... | G06F 21/55 |
| | | | | 726/1 |

(Continued)

OTHER PUBLICATIONS

Kim et al., "How to build enterprise data models to achieve compliance to standards or regulatory requirements and share data," Journal of the Association for Information Systems, vol. 8, Issue 2, Article 2, pp. 105-128, Feb. 2007. (Year: 2007).*

(Continued)

*Primary Examiner* — Jonathan P Ouellette
(74) *Attorney, Agent, or Firm* — Loeb & Loeb LLP

(57) ABSTRACT

The system and method provides a way for suppliers to automatically submit the necessary compliance documentation and artifacts to the standard compliance body and have the compliance be verified and communicated to indicated buyers or third parties. Further, the system and method may automatically inform suppliers of changes to standards.

20 Claims, 3 Drawing Sheets

(56) References Cited

U.S. PATENT DOCUMENTS

| | | | | |
|---|---|---|---|---|
| 2014/0222521 A1* | 8/2014 | Chait | ................ | G06Q 10/0637 705/7.36 |
| 2014/0222522 A1* | 8/2014 | Chait | ................ | G06Q 10/0637 705/7.36 |
| 2015/0242862 A1* | 8/2015 | Rupple | ................ | G06Q 30/018 705/317 |
| 2015/0302420 A1* | 10/2015 | Nair | ................... | G06Q 30/018 705/317 |

OTHER PUBLICATIONS

WHOA.com, "WHOA.com Cloud Security Management System Achieves ISO 27001 Certification," https://www.whoa.com/whoa-cloud-security-management-system-achieves-iso-27001-certification/, Feb. 10, 2014 (Year: 2014).*

Yippy ("Yippy,Inc. (YIPI) Selects ISMS Solutions for ISO Certifications," https://www.marketwatch.com/press-release/yippy-inc-yipi-selects-isms-solutions-for-iso-certifications-2014-10-21-91732819, Oct. 21, 2014 (Year: 2014).*

\* cited by examiner

US 10,878,427 B2

SYSTEM AND METHOD TO ENSURE COMPLIANCE WITH STANDARDS

CROSS-REFERENCE TO RELATED APPLICATIONS

This application claims the benefit of U.S. Provisional Application No. 62/327,892, filed Apr. 26, 2016, the incorporation of which is made by reference herein.

BACKGROUND

Standards are common in modern business. The standards are designed to ensure businesses maintain an adequate level of performance. Standards make it easier for a buyer to be confident a supplier will perform adequately. Further, buyers do not have to monitor suppliers for standard compliance as the duty to confirm compliance resides with the standard organization. However, maintaining and verifying compliance with a standard, especially when the standard changes over time, or when there are multiple standards, is expensive and time-taking.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

The system and method provides a way for suppliers to automatically submit the necessary compliance documentation and artifacts to the standard compliance body and have the compliance be verified and communicated to indicated buyers or third parties. Further, the system and method may automatically inform suppliers of changes to standards.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

DESCRIPTION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description is, therefore, not to be taken in a limiting sense.

Figure 1:
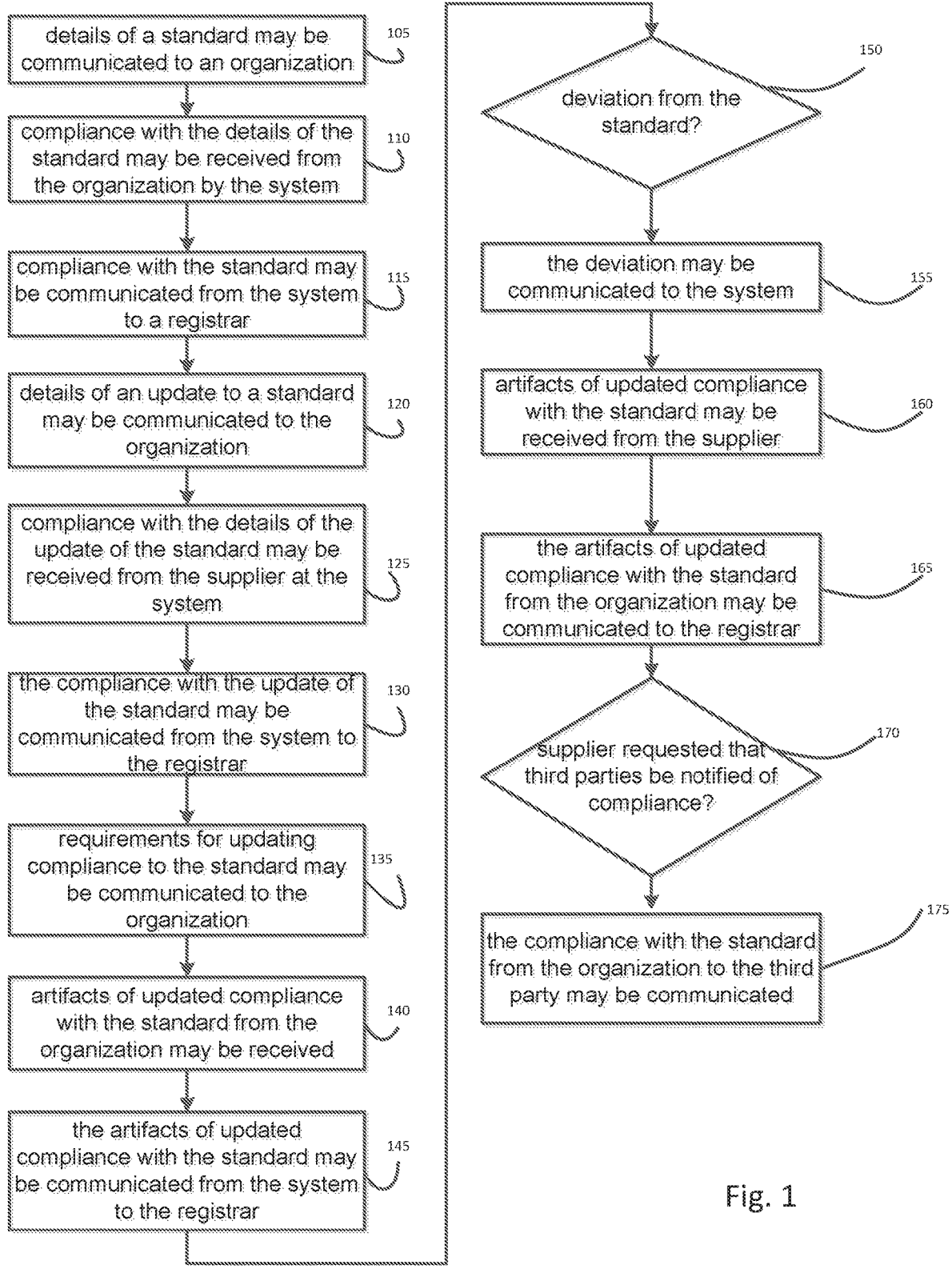
FIG. 1 may be a flow chart of the method.

Referring to FIG. 1, a system and method of verifying compliance with a standard in real time is disclosed. Standards are common in modern business. The standards are designed to ensure businesses maintain an adequate level of performance. Standards make it easier for a buyer to be confident a supplier will perform adequately. Further, buyers do not have to monitor suppliers for standard compliance as the duty to confirm compliance resides with the standard organization. However, maintaining and verifying compliance with a standard, especially when the standard changes over time, or when there are multiple standards, is expensive and time-taking. The system and method provides a way for suppliers to automatically submit the necessary compliance documentation and artifacts to the standard compliance body and have the compliance be verified and communicated to indicated buyers or third parties. Further, the system and method may automatically inform suppliers of changes to standards.

At block 105, details of a standard may be communicated to an organization. The communication may take on a variety of forms. In some embodiments, the communication may be a simple "to do" list. In other embodiments, the communication may be an app that a user installs and the app may have a plurality of steps which prompt a user on the steps that need to be taken to be in compliance with the standard. The app may contain a wizard which may describe the necessary task and provide examples, answer frequently asked questions, provide links to the standard for more information, etc.

Communication may occur between the system to the organization, or between a computer of the system and a computer associated with the organization, via any of a variety of communications networks. For example, the Internet, local area networks, software installed locally and transported from the organization to the system, or any other suitable mode of computer communication.

The standard may take on a variety of forms. In one embodiment, the standard is an International Standards Organization ("ISO"). ISO is an independent, non-governmental international organization with a membership of 162 national standards bodies. Through its members, it brings together experts to share knowledge and develop voluntary, consensus-based, market-relevant International Standards that support innovation and provide solutions to global challenges. ISO International Standards ensure that products and services are safe, reliable and of good quality. For business, they are strategic tools that reduce costs by minimizing waste and errors and increasing productivity. They help companies to access new markets, level the playing field for developing countries and facilitate free and fair global trade. Our standards are developed by the people that need them, through a consensus process. Experts from all over the world develop the standards that are required by their sector. This means they reflect a wealth of international experience and knowledge.

There are hundreds, if not thousands, of standards. More than one standard may apply to a single supplier. The system and method disclosed herein may be able to communicate details on more than one standard. In fact, some aspects of standards may overlap such that complying with part of a first standard may cover complying with an additional aspect of another standard.

At block 110, compliance with the details of the standard may be received from the organization by the system, such as by a computer associated with the system, such that the organization can indicate the standard has been met. The compliance may come in many forms. In one embodiment, the compliance may be a certification that the organization has complied with the standard. In another embodiment, more objective data may be submitted, such as testing results or other data relevant to the standard. In some embodiments, the compliance may be one or more changes to a procedure or may be documents that indicate a method or device had been modified to meet the standard.

At block 115, compliance with the standard may be communicated from the system to a registrar such that the standard registrar will know the organization is in compliance with the standard. Further, anyone that searches the standard may see that the organization has met the requirements of the standard. Finally, the registrar may want to ensure that the organization is in compliance so the registrar may resist in chasing the organization for compliance details. Communication may occur between the system and the registrar, or between a computer of the system and a computer associated with the registrar, via any of a variety of communications networks. For example, the Internet, local area networks, software installed locally and transported from the organization to the system, or any other suitable mode of computer communication.

At block 120, details of an update to a standard may be communicated to the organization. As would be expected, standards are updated to addressed changing technologies and working environments. Further, standards may be changed to address problems which may have developed since the last version of the standard was released. Thus, in order to stay in compliance with a standard, updates may need to be communicated to organizations.

In some embodiments, the updates may be communicated to organizations automatically, such as when the new standards are released publically. In another embodiment, the updates may be communicated periodically, such as once a week, such that an organization may not become overwhelmed by an endless stream of messages if several standards are involved. In other embodiments, the organization may schedule a time to "pull" updates rather than receive "pushed" updates.

As part of the update, a wizard or checklist may be communicated to organizations that reflect the updates to the standards. The updated requirements may be indicated to the organizations in a variety of ways, such as different colors, underlining, highlighting, etc. In some embodiments, a time limit may be part of the communication and a warning may also be communicated if the update is not acted upon in an appropriate amount of time.

At block 125, compliance with the details of the update of the standard may be received from the supplier or organization at the system. The compliance with the new updates may be received in a similar manner as compliance with the base standards. At block 130, the compliance with the update of the standard may be communicated from the system to the registrar. Again, the communication may be completed in a similar manner as the initial communication from the supplier to the registrar.

At block 135, requirements for updating compliance to the standard may be communicated to the organization. Logically, compliance with a standard is not a one-time event. The compliance needs to be updated and verified periodically. Thus, reminders and requests for updates may be communicated from the system to the organization.

At block 140, artifacts of updated compliance with the standard from the organization or a supplier may be received. Artifacts may include tangible evidence that an organization has complied with a standard. For example, if a standard requires that a certain metal is to be used in a process, certification from the metal supplier may be an artifact that the organization has complied with the standard. Similarly, certificates of completed training course may be an artifact that may be submitted. The artifacts may be stored by the system for future reference.

At block 145, the artifacts of updated compliance with the standard may be communicated from the system to the registrar. Logically, artifacts may go out of date or may be need to be periodically updated depending on the standard in question. As an example, in certain mission critical standards, every batch of raw material may have to be certified. However, in other non-mission critical standards, the testing and related artifacts may have to be submitted less frequently.

At block 150, the system may determine if there has been a deviation from the standard. The deviation may take many forms depending on the standard. In a simple embodiment, the organization or supplier may not have supplied the necessary documentation that it has complied with an update to the standard. In yet another embodiment, an artifact as to a type of metal used may indicate an unacceptable level of impurities in the metal based on updated standards.

At block 155, in response to determining that there has been a deviation from the standard, the deviation may be communicated to the system. In some embodiments, the deviation may be determined by the system and in other embodiments, the deviation may be determined by the registrar. In either case, the deviation may be communicated to the supplier. In addition, the system may analyze the deviation and, if possible, provide suggestions on how to become compliant with the standard. As an example, if the metal used has an unacceptable level of impurities, then the system may suggest buying metal with a lower level of impurities. At block 160, artifacts of updated compliance with the standard may be received from the supplier or organization, and at block 165, the artifacts of updated compliance with the standard from the organization may be communicated to the registrar.

At block 170, the system may determine if the supplier or organization requested that third parties be notified of compliance of one or more standards. In the modern workplace, buyers from suppliers or organizations want to be confident the suppliers or organizations are in compliance with applicable standards. Thus, third party buyers may request that suppliers or organizations provide them official notice from the standards organization that compliance has occurred.

At block 175, the compliance with the standard from the organization to the third party may be communicated. The compliance may come directly from the standards organization or, in another embodiment, the certificate of compliance from the standards organization may be stored by the system as a central point of contact and the system may communicate the compliance as needed, thereby lessening the burden on the standards organization.

Figure 2:
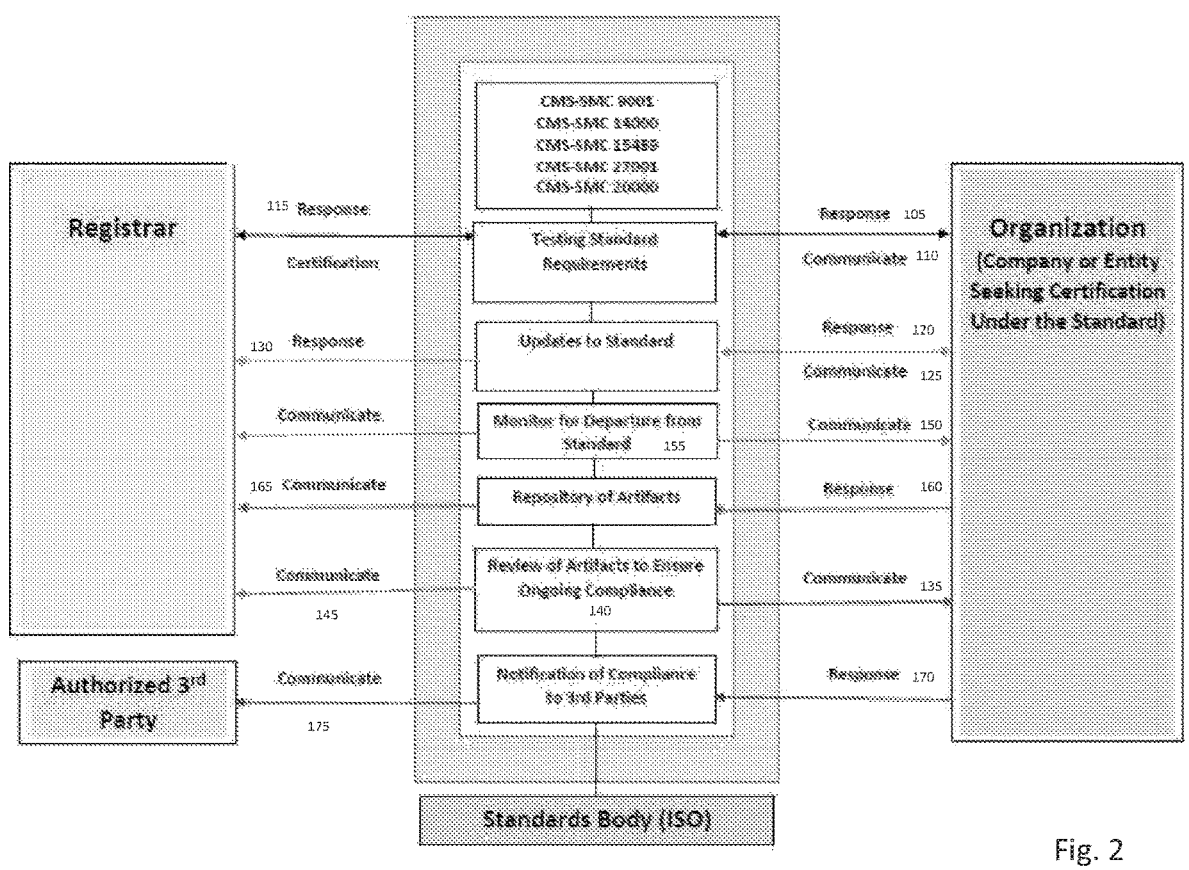
FIG. 2 is an illustration of the data flow of the system.

FIG. 2 may be one embodiment of the data flows in the claimed system and method. The blocks may be the same or similar to the blocks illustrated in FIG. 1, just illustrated in a format to show the relationship between the registrar, the system, and the organization. Logically, the arrows may indicate the direction of the data flows. Similarly, the data may flow in a variety of manners once the standard has been initially set up. For example, an update may occur before a lack of compliance is detected.

Figure 3:
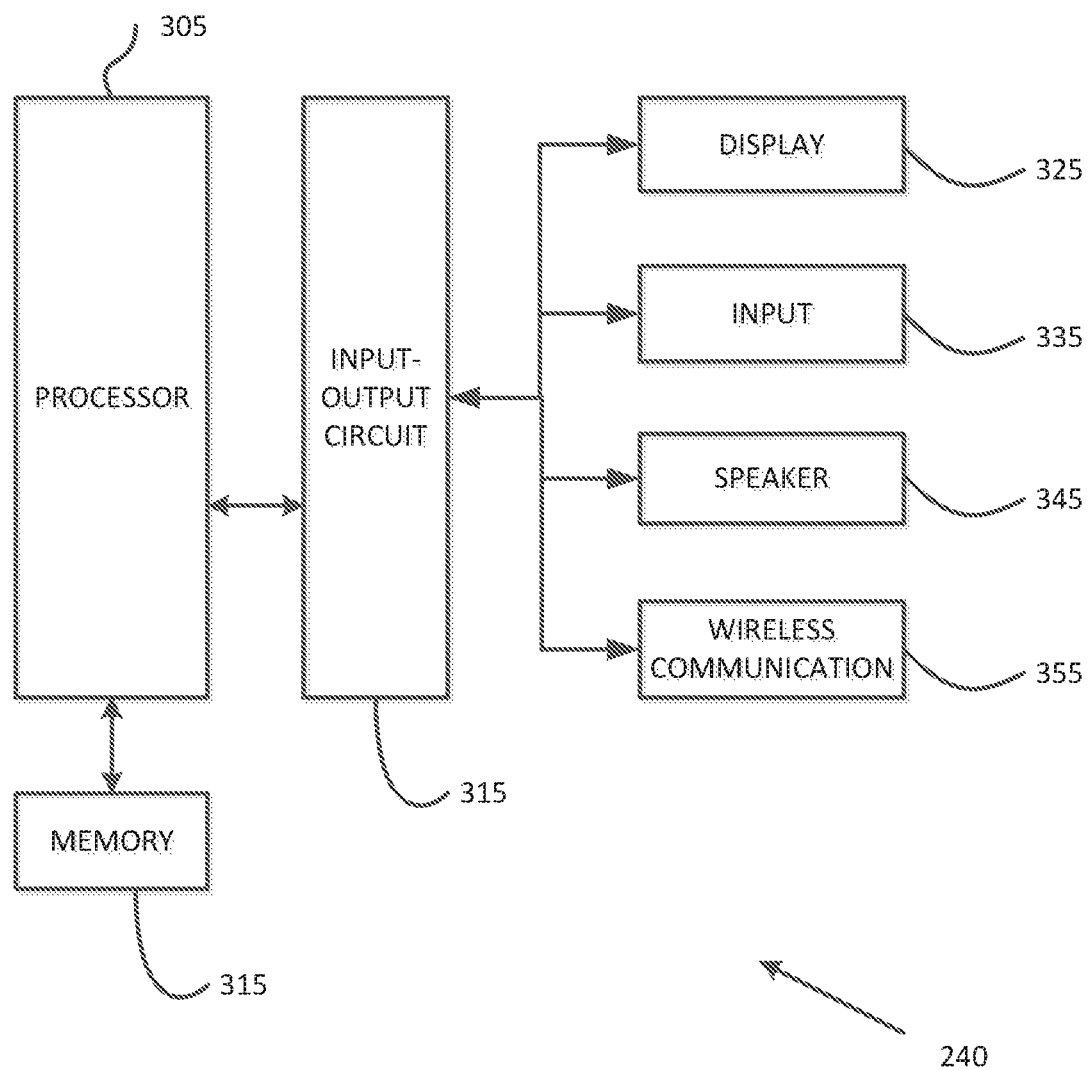
FIG. 3 is an illustration of a computing device that may be physically configured to execute the method.

FIG. 3 may illustrate the physical elements that may be used by a computing device 240 that may be used to access the system application. The computing device 240, which may be portable, may have a processor 305 which may be physically configured according to computer executable instructions. A memory 315 may be in communication with the processor 305 and the memory may store data that may be useful to the processor 305. The processor 305 may be in communication with an input-output circuit 315 which may manage communications to and from the processor 305. The input-output circuit 315 may be in communication with a display 325 which may be touch sensitive. The input-output circuit 315 may be in communication with a display 325, an input device 335 such as a touch pad, a touch screen, a keyboard, etc. The input-output circuit 315 may be in communication with a speaker 345 which may be used to communicate messages to the user by voice. The input-output circuit 315 may be in communication with a wireless communication circuit which may be used to communicate wirelessly in a variety of forms such as via Bluetooth, Wi-Fi, cellular, or any other appropriate RF communication form and format.

The user devices, computers and servers described herein may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

There may be several technical problems that are addressed by the claimed system and method. In many instances, standards requirements may be very complex and difficult to track or keep up with. The computer systems at individual organizations that are required to keep up with standards are traditionally not set up to automatically track and update the many standards changes, as well as report compliance with those standards. The disclosed invention provides a technical solution to this technical problem.

There may be several advantages to the described system. As mentioned previously, organizations may encounter large burdens in time and resources to keep up with standards and ensure relevant compliance groups and/or customers that the standards have been met. Additionally, the system may provide an additional level of confidence to a customer or other group because the compliance certifications may come from a third-party as opposed to the organization itself. Thus, both organizations and customers of those organizations may benefit from the disclosed system.

The present disclosure provides a solution to the long-felt need described above. In particular, the systems and methods described herein may be configured for improving compliance with industry standards. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computer-implemented method of verifying compliance with a standard in real time, the method comprising
communicating, from a system computer associated with a first entity and via a communication network, details of a standard to an organization computer associated with a second entity organization via a software wizard configured to indicate one or more steps to be taken by the organization to be in compliance with the standard;
receiving, at the system computer from the organization computer and via the communication network, an indication of compliance with the details of the standard;
in response to receiving the indication of compliance with the details of the standard from the organization computer, communicating, from the system computer via the communication network to a registrar computer associated with a third party registrar, the compliance with the standard from the organization so as to indicate to the registrar that the organization is in compliance with the standard;
communicating, from the system computer and via the communication network, details of an update to the standard to the organization computer via the software wizard, wherein the software wizard is configured to indicate one or more steps to be taken by the organization to be in compliance with the update to the standard and wherein the details of the update to the standard include a time limit for complying with the update to the standard;
receiving, at the system computer from the organization computer and via the communication network, an indication of compliance with the details of the update of the standard;
in response to receiving the indication of compliance with the details of the update of the standard communicating, from the system computer to the registrar computer via the communication network, the compliance with the update of the standard from the organization so as to indicate to the registrar that the organization is in compliance with the update to the standard;
communicating, from the system computer via the communication network, requirements for updating compliance with the standard to the organization computer;
receiving, at the system computer from the organization computer and via the communication network, artifacts of updated compliance with the standard, the artifacts of updated compliance providing evidence that the organization has updated compliance with the standard;
in response to receiving the artifacts of updated compliance, communicating, from the system computer to the registrar computer via the communication network, the artifacts of updated compliance with the standard;
based at least partially on the artifacts of updated compliance, determining, at the system computer, a deviation from the standard;
in response to the determination of the deviation from the standard:
communicating, from the system computer, the deviation from the standard to the organization computer and a suggestion on how to remedy the deviation from the standard,
receiving, at the system computer, new artifacts of updated compliance with the standard from the organization computer reflecting the updated compliance in response to communicating the deviation, and
in response to receiving the new artifacts of updated compliance, communicating, from the system computer, the artifacts of updated compliance with the standard to the registrar computer; and
in response to a request from the organization to notify a third party, communicating, from the system computer, the compliance with the standard to a computer associated with the third party.

2. The method of claim 1, wherein the standard is an International Standards Organization (ISO) standard.

3. The method of claim 1, wherein there are a plurality of standards.

4. The method of claim 1, wherein artifacts are stored and forwarded to a standard authority.

5. The method of claim 1, wherein updates to the standard are retrieved automatically.

6. The method of claim 5, wherein requirements for the standard are updated to match the updated standard.

7. The method of claim 1, wherein third parties are required by contract to be notified automatically.

8. The method of claim 1, wherein compliance comprises a certification that the standard has been complied with.

9. The method of claim 1, wherein artifacts comprises tangible evidence that a standard has been complied with.

10. The method of claim 1, further comprising communicating a deadline to comply with the updated standard.

11. A non-transitory computer-readable storage medium for verifying compliance with a standard in real time, the computer-readable storage medium comprising computer-executable instructions which, when executed, cause a processing system to execute steps comprising:

communicating, from a system computer associated with first entity and via a communication network, details of a standard to an organization computer associated with a second entity organization via a software wizard configured to indicate one or more steps to be taken by the organization to be in compliance with the standard;

receiving, at the system computer from the organization computer and via the communication network, an indication of compliance with the details of the standard;

in response to receiving the indication of compliance with the details of the standard from the organization computer, communicating, from the system computer via the communication network to a registrar computer associated with a third entity registrar, the compliance with the standard from the organization so as to indicate to the registrar that the organization is in compliance with the standard;

communicating, from the system computer and via the communication network, details of an update to the standard to the organization computer via the software wizard, wherein the software wizard is configured to indicate one or more steps to be taken by the organization to be in compliance with the update to the standard and wherein the details of the update to the standard include a time limit for complying with the update to the standard;

receiving, at the system computer from the organization computer and via the communication network, an indication of compliance with the details of the update of the standard;

in response to receiving the indication of compliance with the details of the update of the standard communicating, from the system computer to the registrar computer via the communication network, the compliance with the update of the standard from the organization so as to indicate to the registrar that the organization is in compliance with the update to the standard;

communicating, from the system computer via the communication network, requirements for updating compliance with the standard to the organization computer;

receiving, at the system computer from the organization computer and via the communication network, artifacts of updated compliance with the standard, the artifacts of updated compliance providing evidence that the organization has updated compliance with the standard;

in response to receiving the artifacts of updated compliance, communicating, from the system computer to the registrar computer via the communication network, the artifacts of updated compliance with the standard;

based at least partially on the artifacts of updated compliance, at the system computer, determining a deviation from the standard;

in response to the determination of the deviation from the standard:

communicating, from the system computer, the deviation from the standard to the organization computer and a suggestion on how to remedy the deviation from the standard, receiving, at the system computer, new artifacts of updated compliance with the standard from the organization computer reflecting the updated compliance in response to communicating the deviation, and in response to receiving the new artifacts of updated compliance with the standard, communicating, from the system computer, the artifacts of updated compliance with the standard to the registrar computer; and in response to a request from the organization to notify a third party, communicating, from the system computer, the compliance with the standard from to a computer associated with the third party.

12. The non-transitory computer-readable storage medium of claim 11, wherein the standard is an International Standards Organization (ISO) standard.

13. The non-transitory computer-readable storage medium of claim 11, wherein there are a plurality of standards.

14. The non-transitory computer-readable storage medium of claim 11, wherein artifacts are stored and forwarded to a standard authority.

15. The non-transitory computer-readable storage medium of claim 11, wherein updates to the standard are retrieved automatically.

16. The non-transitory computer-readable storage medium of claim 15, wherein requirements for the standard are updated to match the updated standard.

17. The non-transitory computer-readable storage medium of claim 11, wherein third parties are required by contract to be notified automatically.

18. The non-transitory computer-readable storage medium of claim 11, wherein compliance comprises a certification that the standard has been complied with.

19. The non-transitory computer-readable storage medium of claim 11, wherein artifacts comprises tangible evidence that a standard has been complied with.

20. The non-transitory computer-readable storage medium of claim 11, further comprising communicating a deadline to comply with the updated standard.

* * * * *